(12) United States Patent
Laulainen et al.

(10) Patent No.: US 9,088,376 B2
(45) Date of Patent: Jul. 21, 2015

(54) METHOD AND SYSTEM FOR SYNCHRONIZATION

(75) Inventors: Mikko Laulainen, Helsinki (FI); Kenneth Hann, Espoo (FI); Jorma Kausiala, Espoo (FI)

(73) Assignee: CORIANT OY, Espoo (FI)

( * ) Notice: Subject to any disclaimer, the term of this patent is extended or adjusted under 35 U.S.C. 154(b) by 1445 days.

(21) Appl. No.: 11/907,810

(22) Filed: Oct. 17, 2007

(65) Prior Publication Data

US 2008/0101514 A1 May 1, 2008

Related U.S. Application Data

(60) Provisional application No. 60/829,982, filed on Oct. 18, 2006.

(51) Int. Cl.
*H04J 3/06* (2006.01)

(52) U.S. Cl.
CPC ............... *H04J 3/0661* (2013.01); *H04J 3/065* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 7,649,910 B1 * | 1/2010 | Wechsler et al. | 370/503 |
| 7,660,330 B1 * | 2/2010 | Shmilovici | 370/503 |
| 2006/0245453 A1 * | 11/2006 | Bedrosian | 370/503 |
| 2007/0076763 A1 * | 4/2007 | Ellegaard et al. | 370/503 |
| 2009/0016384 A1 * | 1/2009 | Cheng et al. | 370/512 |
| 2010/0008384 A1 * | 1/2010 | Hamasaki | 370/503 |

FOREIGN PATENT DOCUMENTS

| | | | |
|---|---|---|---|
| EP | 1 669 159 A1 | | 9/2005 |
| WO | WO 03/017545 A1 | | 2/2003 |
| WO | WO 2007/017340 A1 | | 2/2007 |

OTHER PUBLICATIONS

Kannisto, Joha et al., Precision Time Protocol Prototype on Wireless LAN, Telecommunications and Networking—ICT 2004 Lecture Notes in Computer Science; LNCS, Springer-Verlag, BE, vol. 3124, 2004, pp. 1236-1245, XP019009251.

* cited by examiner

*Primary Examiner* — Gregory Sefcheck
(74) *Attorney, Agent, or Firm* — Birch, Stewart, Kolasch & Birch, LLP

(57) ABSTRACT

The invention relates to a method and a system for transferring timing messages in a digital data transfer system. In a solution according to the invention a timing message is transferred (101, 102, 103) within control data carried in a protocol data unit. The timing message is dependent on a transmission moment of the protocol data unit from a network element of the digital data transfer system. The control data is a synchronization status message (Ethernet-SSM) carried in an Ethernet-frame. Therefore, the number of such protocol data units that are dedicated only for timing purposes can be reduced.

7 Claims, 6 Drawing Sheets

METHOD AND SYSTEM FOR SYNCHRONIZATION

FIELD OF THE INVENTION

The invention relates to synchronization associated with a digital data transfer system and, more particularly, to a method and system for transferring timing messages in a digital data transfer system.

BACKGROUND

In many digital data transfer systems there is a need to synchronize clock devices of different network elements with respect to each other in such a way that phase values, and possibly also time values, maintained in different network elements are sufficiently close to each other. In other words, each of the clock devices of different network elements should indicate a phase value, and possibly also a time value, that is common to all network elements in question. A common time value is usually called as "wall clock time" or "universal time". In this document the term "synchronization" means either phase synchronization or time synchronization or both. The above-mentioned network elements can be, for example, user terminals that are connected to a digital data transfer network, routers of a digital data transfer network, or base stations of a cellular mobile network. A digital data transfer network itself may need synchronization between network elements. For example, in a new generation cellular mobile network, a precondition for successful data transmission between base stations and a mobile phone that moves from a coverage area of a certain base station to a coverage area of another base station is the fact that the base stations follow a common phase value, and possibly also a time value, with a sufficient accuracy. It is also possible that a user application that is based on a digital data transfer system may require synchronization. For example, in an application for monitoring a power grid, measurements having accurate timing information are transferred to a central control station where informed decisions can be made in possible emergency situations.

In a solution according to the prior art clock devices of network elements that are to be synchronized with respect to each other are synchronized with the aid of a timing signal that is received from a GPS-satellite (Global Positioning System). In the future, it may be possible to use also the European Galileo-system and/or the Russian GLONASS-system together with or instead of the GPS-system. A GPS-receiver and an antenna system increase, however, the component and manufacturing costs of a network element. Furthermore, the antenna system connected to the network element has to be situated in such a way that the GPS-signal can be received with a sufficient power level. A network element such as a router or a switching centre can be located in underground premises. In this case, there is a need to build a cabling system with the aid of which a received GSP-signal can be delivered from a terrestrial antenna to the network element located in the underground premises.

In another solution according to the prior art, network elements are arranged to transmit timing messages, e.g. timestamps, to each other within dedicated protocol data units that are used for timing purposes in order to achieve mutual synchronization. An example of a synchronization method according to the prior art is presented in IEEE 1588 specification (Institute of Electrical and Electronics Engineers). The synchronization method requires multiple exchanges of different timing messages. A protocol data unit (PDU) can be, for example, a data transfer packet, a data transfer frame, or a data transfer cell. A data transfer packet can be e.g. an IP-datagram (Internet Protocol), a data transfer frame can be e.g. a Frame Relay-frame, and a data transfer cell can be e.g. an ATM-cell (Asynchronous Transfer Mode). Transmission of protocol data units that are dedicated for timing purposes consumes, however, data transfer capacity that would/might be needed for payload data.

SUMMARY

In accordance with a first aspect of the invention, there is provided a new method for transferring a timing message from a first network element to a second network element, the first network element and the second network element being interconnected with data transfer elements of a digital data transfer network. The method is characterized in that it comprises:

in the first network element, writing the timing message into control data carried in a protocol data unit, the timing message being dependent on a transmission moment of said protocol data unit from the first network element, said protocol data unit being an Ethernet-frame, and said control data being a synchronization status message (Ethernet-SSM) carried in the Ethernet-frame, transferring said protocol data unit from the first network element to the second network element, and in the second network element, reading said timing message from said control data carried in said protocol data unit.

A benefit provided by embodiments of the present invention when compared with prior art solutions of the kind described earlier in this document is that the transmission of timing messages does not consume data transfer capacity that may be needed for payload data and, on the other hand, there is no need to provide a network element with equipment for receiving timing signals from external timing sources, e.g. from satellites. The benefit is provided by the fact that the timing messages are transferred within control data of Ethernet-frames. Therefore, the number of such protocol data units that are dedicated only for timing purposes can be reduced.

The above-mentioned synchronization status messaging (Ethernet-SSM) is disclosed e.g. in an ITU-T (International Telecommunication Union) draft recommendation G.8261/Y.1361 appendix VIII "*Synchronization Status Messaging in synchronous Ethernet*". The original purpose of a synchronization status message of a digital signal is to indicate a quality category of a source of a clock signal that is associated with transmission of the digital signal.

In accordance with a second aspect of the invention, there is provided a new system for transferring a timing message from a first network element to a second network element, the first network element and the second network element being interconnected with data transfer elements of a digital data transfer network. The system is characterized in that it comprises:

in the first network element, a writing unit arranged to write the timing message into control data carried in a protocol data unit, the timing message being dependent on a transmission moment of said protocol data unit from the first network element, said protocol data unit being an Ethernet-frame, and said control data being a synchronization status message (Ethernet-SSM) carried in the Ethernet-frame, and in the second network element, a reading unit arranged to read said timing message from said control data carried in said protocol data unit.

In accordance with a third aspect of the invention, there is provided a new network element comprising a transmitter arranged to transmit a first protocol data unit and a receiver arranged to receive a second protocol data unit. The network element is characterized in that it comprises:

a writing unit arranged to write a first timing message into first control data carried in a first protocol data unit, the timing message being dependent on a transmission moment of said first protocol data unit from the network element, said first protocol data unit being an Ethernet-frame and said first control data being a synchronization status message (Ethernet-SSM) carried in the Ethernet-frame, and a reading unit arranged to read a second timing message from second control data carried in a second protocol data unit, said second protocol data unit being an Ethernet-frame, and said second control data being a synchronization status message (Ethernet-SSM) carried in the Ethernet-frame.

In accordance with a fourth aspect of the invention, there is provided a new computer program product for controlling a network element to support synchronization, the network element comprising a transmitter arranged to transmit a first protocol data unit and a receiver arranged to receive a second protocol data unit. The computer program product is characterized in that it comprises:

computer program modules for making the network element to write a first timing message into first control data carried in a first protocol data unit, the timing message being dependent on a transmission moment of said first protocol data unit from the network element, said first protocol data unit being an Ethernet-frame, and said first control data being a synchronization status message (Ethernet-SSM) carried in the Ethernet-frame, and computer program modules for making the network element to read a second timing message from second control data carried in a second protocol data unit, said second protocol data unit being an Ethernet-frame, and said second control data being a synchronization status message (Ethernet-SSM) carried in the Ethernet-frame.

Various embodiments of the invention both as to constructions and to methods of operation, together with additional objects and advantages thereof, will be best understood from the following description of specific embodiments when read in connection with the accompanying drawings.

The embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF FIGURES

Embodiments of the invention presented in the sense of examples and their advantages are explained in greater detail below with reference to the accompanying drawings, in which.

DETAILED DESCRIPTION OF THE EMBODIMENTS

Figure 1:
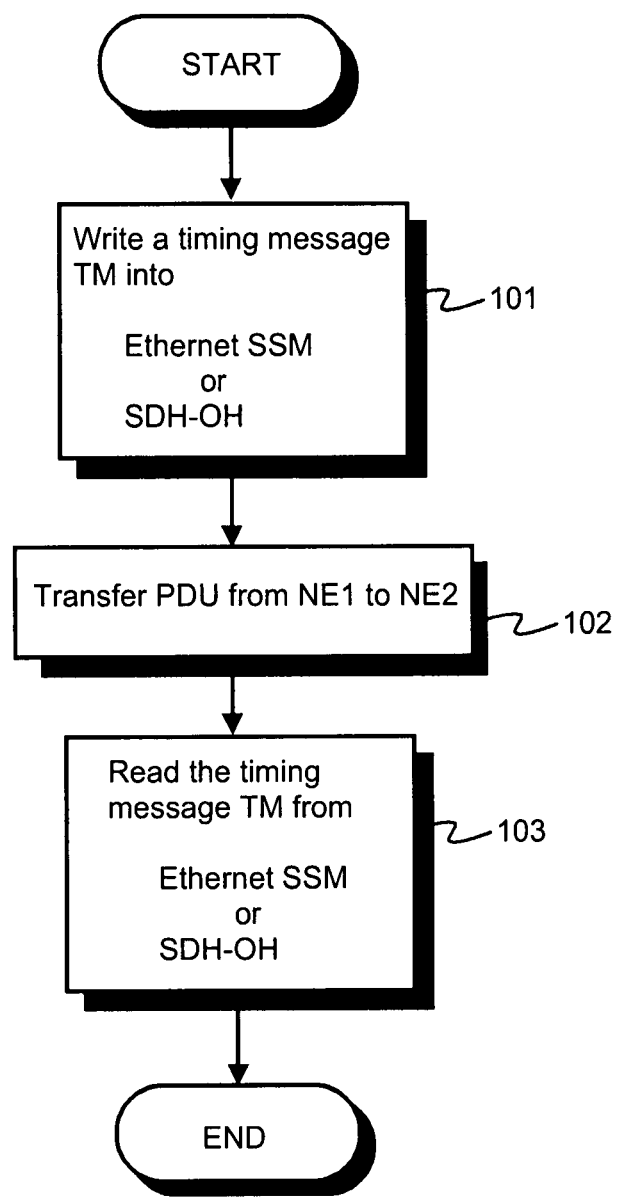
FIG. 1 shows a flow chart for a method according to an embodiment of the invention for transferring a timing message from a first network element to a second network element.

FIG. 1 shows a flow chart for a method according to an embodiment of the invention for transferring a timing message from a first network element NE1 to a second network element NE2. The first network element NE1 and the second network element NE2 are interconnected with data transfer elements of a digital data transfer network. In the first network element NE1, a timing message TM is written into control data carried in a protocol data unit PDU, phase 101. The protocol data unit PDU can be an Ethernet-frame, a Synchronous Optical Network-frame (SONET), or a Synchronous Digital Hierarchy-frame (SDH). The control data can be a synchronization status message (Ethernet-SSM) carried in an Ethernet-frame, an overhead (OH) of a Synchronous Optical Network-frame (SONET), or an overhead (OH) of a Synchronous Digital Hierarchy-frame (SDH). In phase 102, the protocol data unit PDU is transferred from the first network element NE1 to the second network element NE2. The timing message TM can be, for example, a timestamp or some other kind of message that is dependent on a transmission moment of the protocol data unit PDU from the first network element NE1. The timing message TM can be used for performing synchronization between network elements of a digital data transfer system. A timestamp can be a time value that is measured with a clock device of the first network element NE1 and that is associated with the transmission moment of the protocol data unit PDU from the first network element NE1. In the second network element NE2, the timing message TM is read from the above-mentioned control data carried in the protocol data unit PDU, phase 103.

In a method according to an embodiment of the invention the control data is a section overhead (SOH) of a Synchronous Digital Hierarchy-frame (SDH). In a method according to another embodiment of the invention the control data is a path overhead (POH) of a Synchronous Digital Hierarchy-frame (SDH).

Figure 2A:
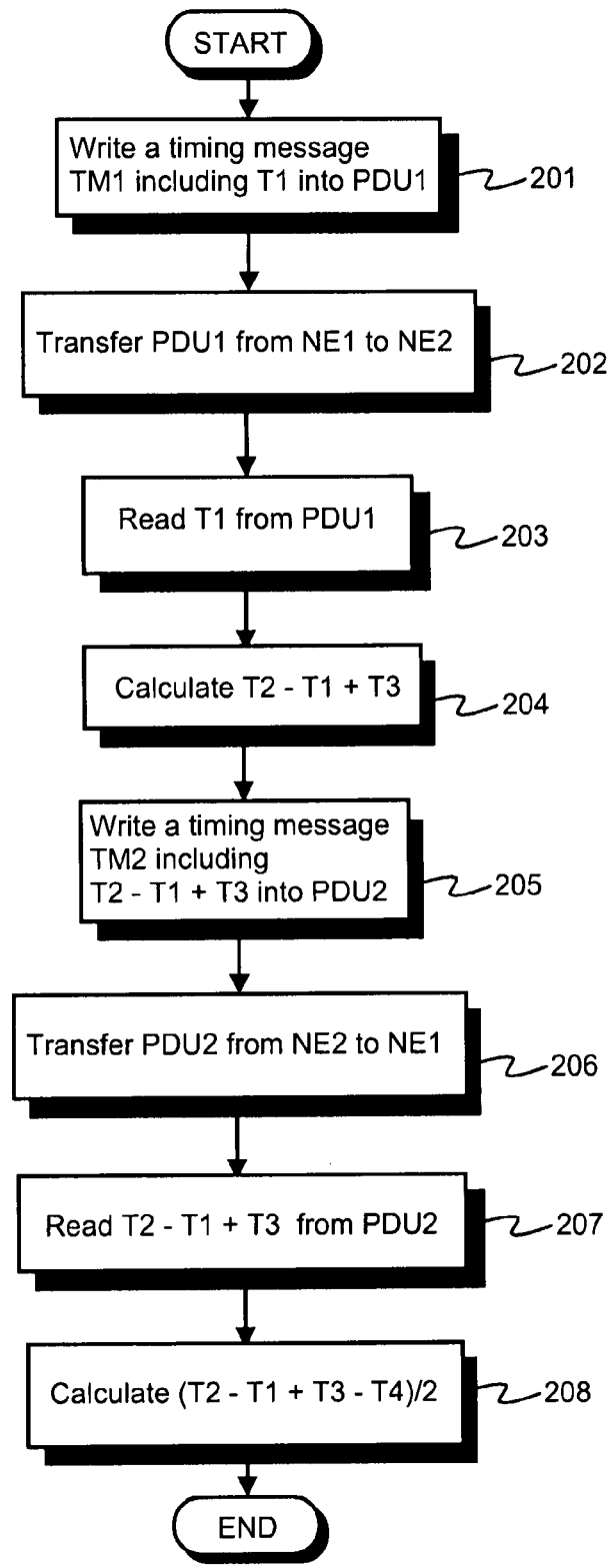
FIGS. 2a and 2b show a flow chart and a timing diagram for a method according to an embodiment of the invention for transferring timing messages in a master-slave synchronization system.

FIG. 2a shows a flow chart for a method according to an embodiment of the invention for transferring timing messages in a master-slave synchronization system. A first network element NE1 and a second network element NE2 are interconnected with data transfer elements of a digital data transfer network. The first network element NE1 operates as a slave of the master-slave synchronization system and the second network element NE2 operates as a master of the master-slave synchronization system.

In the slave network element NE1, a timing message TM1 is written into control data carried in a protocol data unit PDU1, phase 201. The timing message TM1 includes a time value T1 (timestamp) that is measured with a clock device of the slave network element NE1 and is associated with a transmission moment of the protocol data unit PDU1. The control data carried in the protocol data unit PDU1 can be a synchronization status message (Ethernet-SSM) carried in an Ethernet-frame, an overhead (OH) of a Synchronous Optical Network-frame (SONET), or an overhead (OH) of a Synchronous Digital Hierarchy-frame (SDH). In phase 202, the protocol data unit PDU1 is transferred from the slave network element NE1 to the master network element NE2. In the master network element NE2, the timing message TM1 is read from the above-mentioned control data of the protocol data unit PDU1, phase 203. Therefore, the time value T1 is read from the protocol data unit PDU1. In phase 204, a value T2−T1+T3 is calculated in the master network element NE2. T2 is a time value measured with a clock device of the master network element NE2 and associated with an arrival moment of the protocol data unit PDU1 to the master network element and T3 is a time value measured with the clock device of the master network element and associated with a transmission moment of another protocol data unit PDU2 from the master network element. In the master network element NE2, another timing message TM2 is written into control data carried in the other protocol data unit PDU2, phase 205. The other timing message TM2 includes substantially the above-mentioned value T2−T1+T3. In phase 206, the other protocol data unit PDU2 is transferred from the master network element NE2 to the slave network element NE1. In the slave network element NE1, the value T2−T1+T3 is read from the control data carried in the other protocol data unit PDU2, phase 207. In the slave network element NE1, an indicator of timing offset between the clock devices of the slave network element and the master network element is calculated according to an equation (T2−T1+T3−T4)/2. T4 is a time value measured with the clock device of the slave network element and associated with an arrival moment of the other protocol data unit PDU2 to the slave network element NE1. The indicator of timing offset can be used for controlling the clock device of the slave network element.

Figure 2B:
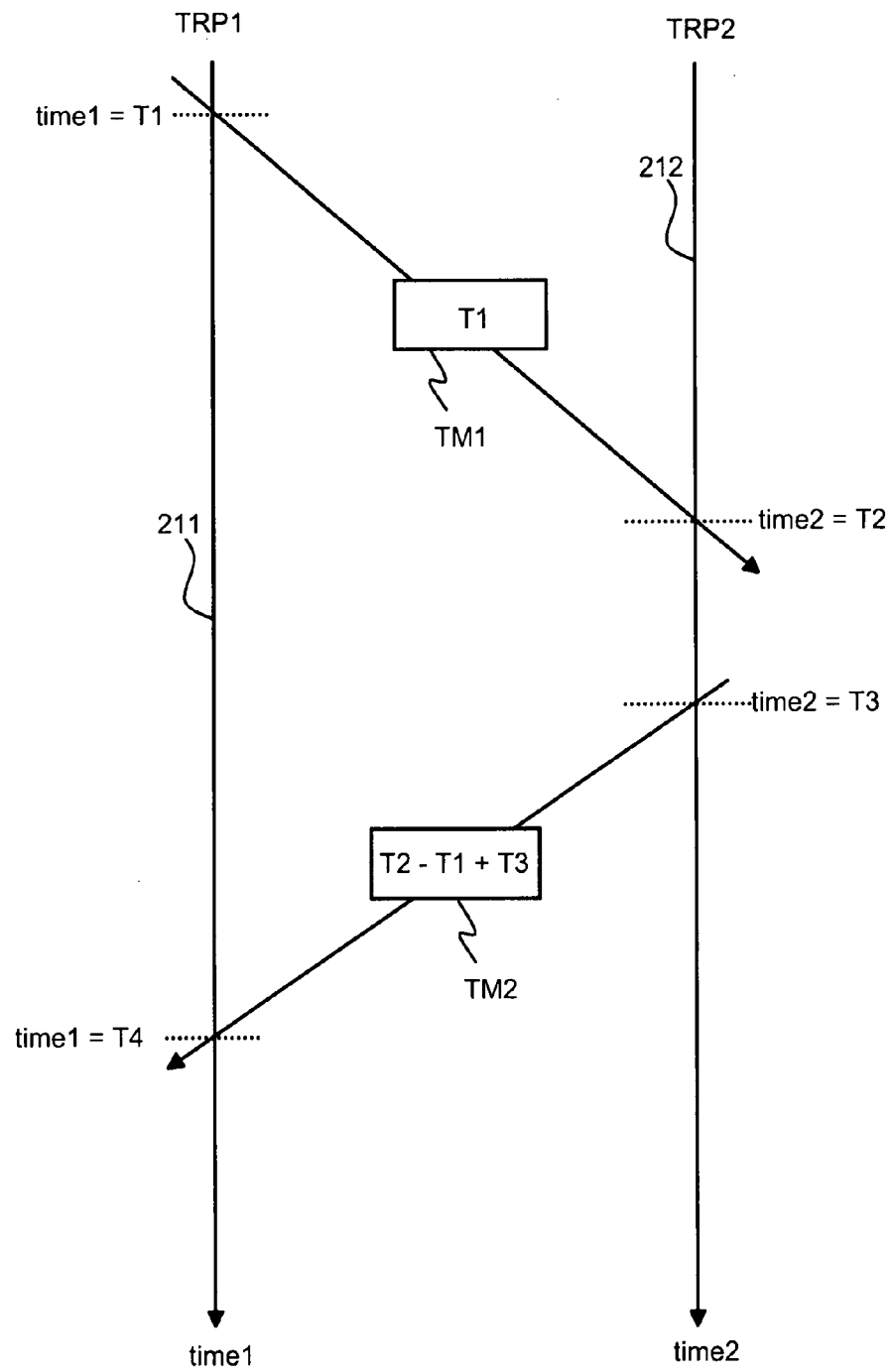

The principle of the method shown in FIG. 2a is illustrated with a timing diagram shown in FIG. 2b. Time axis 211 represents time (time1) measured with the clock device of the slave network element NE1. Time axis 212 represents time (time2) measured with the clock device of the master network element NE2. The clock devices of the slave network element and the master network element may show different values (time1≠time2) due to possible timing offset between the said clock devices. In this exemplifying situation, the timing message TM1 passes a timing reference point TRP1 of the slave network element NE1 at a time instant when the clock device of the slave network element shows time1=T1. The timing message TM1 passes a timing reference point TRP2 of the master network element NE2 at a time instant when the clock device of the master network element shows time2=T2. A timing reference point (TRP1, TRP2) is preferably such a point in a data path of a network element that there is no substantial stochastic transfer delay between the timing reference point and a data transfer link connected to the network element. A difference T2−T1 can be expressed as:

$$T2-T1=\text{Off\_}T1+D2, \quad (1)$$

where Off_T1 is the timing offset (time2−time1) at a time instant when time1=T1 and D2 is a transfer-delay from the timing reference point TRP1 of the slave network element to the timing reference point TRP2 of the master network element. The transfer-delay D2 is expressed in time2 measured with the clock device of the master network element NE2. In this exemplifying situation, the timing message TM2 passes the timing reference point TRP2 of the master network element NE2 at a time instant when the clock device of the master network element shows time2=T3. The timing message TM2 contains a value T2−T1+T3. The timing message TM2 passes the timing reference point TRP1 of the slave network element NE1 at a time instant when the clock device of the slave network element shows time1=T4. A difference T4−T3 can be expressed as:

$$T4-T3=-\text{Off\_}T2+D1, \quad (2)$$

where Off_T2 is the timing offset (time2−time1) at a time instant when time2=T2 and D1 is a transfer-delay from the timing reference point TRP2 of the master network element to the timing reference point TRP1 of the slave network element. The transfer-delay D1 is expressed in time1 measured with the clock device of the slave network element NE1. The equation (T2−T1+T3−T4)/2 gives:

$$(\text{Off\_}T1+\text{Off\_}T2)/2+(D2-D1)/2. \quad (3)$$

With a reasonable accuracy it can be assumed that Off_T1≈Off_T2. Furthermore, it can be assumed that D2≈D1 if the transfer-delay from the master network element to the slave network element can be assumed to be close to the transfer-delay from the slave network element to the master network element and if frequencies of clock signals produced with the clock devices of the master and slave network elements can be assumed to be close to each other. With the above-mentioned assumptions the indicator of the timing offset can be obtained with the equation (T2−T1+T3−T4)/2. The synchronization between the slave network element NE1 and the master network element NE2 can be achieved by controlling the clock device of the slave network element to update time1 in the following way:

$$\text{time1\_updated}=\text{time1\_old}+(T2-T1+T3-T4)/2. \quad (4)$$

Due of the fact that the timing message TM2 includes the value T2−T1+T3, the operation of the method for achieving the synchronization is substantially independent of a time difference between the time instant when time2=T2 and the time instant when time2=T3.

A system according to an embodiment of the invention comprises: (i) in a first network element means for writing a timing message into control data carried in a protocol data unit, said protocol data unit being one of following: an Ethernet-frame, a Synchronous Optical Network-frame (SONET), and a Synchronous Digital Hierarchy-frame (SDH), and said control data being one of the following: a synchronization status message (Ethernet-SSM) carried in the Ethernet-frame, an overhead (OH) of the Synchronous Optical Network-frame (SONET), and an overhead (OH) of the Synchronous Digital Hierarchy-frame (SDH), (ii) means for transferring said protocol data unit from the first network element to a second network element, and (iii) in the second network element means for reading said timing message from said control data carried in said protocol data unit.

Figure 3:
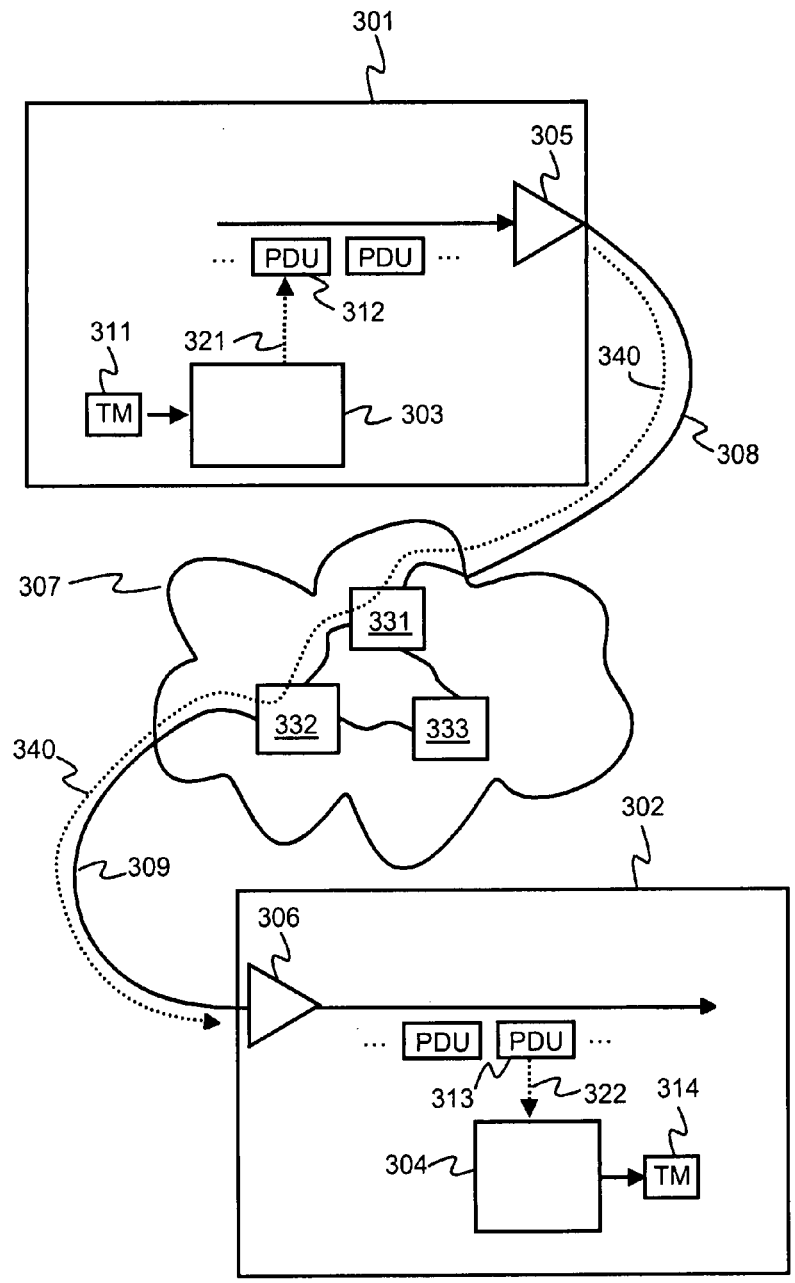
FIG. 3 shows a block diagram of a system according to an embodiment of the invention for transferring timing messages from a first network element to a second network element.

FIG. 3 shows a block diagram of a system according to an embodiment of the invention for transferring a timing message from a first network element 301 to a second network element 302. The network element 301 and the network element 302 are interconnected with data transfer elements 331, 332, and 333 of a digital data transfer network 307. The system comprises in the first network element 301 a writing unit 303 arranged to write a timing message 311 into control data carried in a protocol data unit 312. The control data can be a synchronization status message (Ethernet-SSM) carried in an Ethernet-frame, an overhead (OH) of a Synchronous Optical Network-frame (SONET), or an overhead (OH) of a Synchronous Digital Hierarchy-frame (SDH). A dashed line 321 represents a writing operation of the timing message 311 into the protocol data unit 312. The timing message 311 is dependent on a transmission moment of the protocol data unit 312 from the network element 301. The network element 301 comprises a transmitter 305 arranged to transmit protocol data units to a data transfer link 308 that is connected to the digital data transfer network 307. The system comprises in the second network element 302 a reading unit 304 arranged to read a timing message 314 from control data carried in a protocol data unit 313. A dashed line 322 represents a reading operation of the timing message 314 from the protocol data unit 313. The network element 302 comprises a receiver 306 arranged to receive protocol data units from a data transfer link 309 that is connected to the digital data transfer network 307.

In a system according to an embodiment of the invention the control data is a section overhead (SOH) of a Synchronous Digital Hierarchy-frame (SDH). In this case, the timing message is transferred in a link-by-link manner in the digital data transfer network 307. In each of the network elements 331 and 332 the timing message is read from a section overhead (SOH) associated with a data transfer link terminated at the network element and the timing message is written to a section overhead (SOH) associated with a data transfer link beginning at the network element. A dashed line 340 represents a data transfer path of the timing message from the network element 301 to the network element 302. Also in a case in which the timing message is transferred within a synchronization status message (Ethernet-SSM) of an Ethernet frame, the timing message can be transferred in the link-by-link manner.

In a system according to an embodiment of the invention the control data is a path overhead (POH) of a Synchronous Digital Hierarchy-frame (SDH). In this case, the timing message is transferred in an end-to-end manner from the network element 301 through the digital data transfer network 307 to the network element 302. In the network element 301 the timing message is written into a path overhead (POH) associated with the data transfer path 340 and in the network element 302 the timing message is read from the said path overhead. Therefore, the network elements 331 and 332 are transparent from the viewpoint of the transfer of the timing message.

Figure 4:
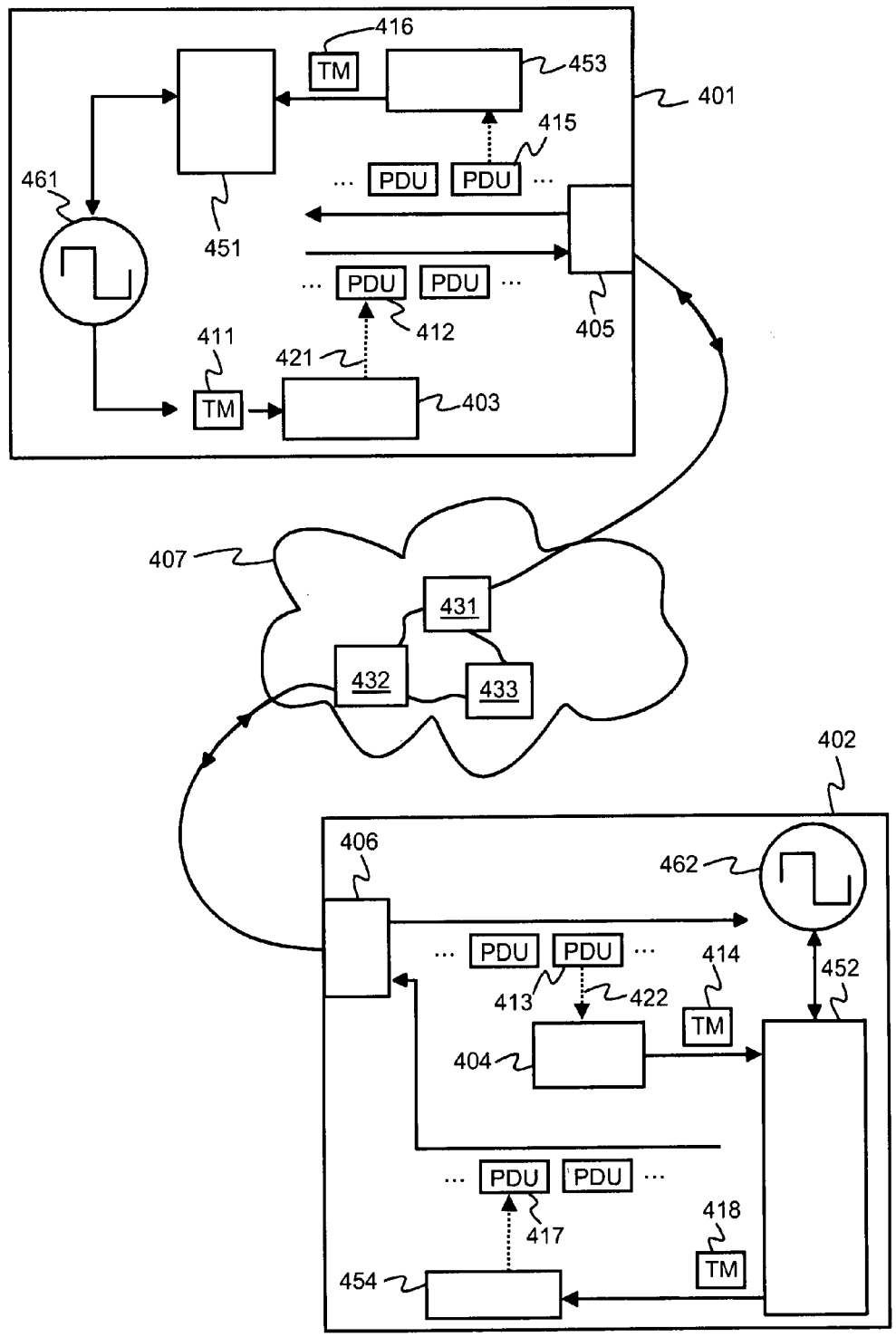
FIG. 4 shows a block diagram of a system according to an embodiment of the invention transferring timing messages in a master-slave synchronization system.

FIG. 4 shows a block diagram of a system according to an embodiment of the invention for transferring timing messages in a master-slave synchronization system. A first network element 401 and a second network element 402 are interconnected with data transfer elements 431, 432, 433 of a digital data transfer network 407. The first network element 401 operates as a slave of the master-slave synchronization system and the second network element 402 operates as a master of the master-slave synchronization system. The slave network element 401 comprises a transceiver 405 (a transmitter-receiver) arranged to transmit protocol data units and to receive protocol data units to/from the digital data transfer network 407. The master network element 402 comprises a transceiver 406 (a transmitter-receiver) arranged to transmit protocol data units and to receive protocol data units to/from the digital data transfer network 407.

The system according to this embodiment of the invention comprises in the slave network element 401 a writing unit 403 arranged to write a timing message 411 into control data carried in a protocol data unit 412 to be transmitted. A dashed line 421 represents a writing operation. The timing message 411 includes a time value T1 measured with a clock device 461 of the slave network element 401 and associated with a transmission moment of the protocol data unit 412 from the slave network element. The system comprises in the master network element 402 a reading unit 404 arranged to read a timing message 414 from control data carried in a received protocol data unit 413. A dashed line 422 represents a reading operation. The system comprises in the master network element 402 a writing unit 454 arranged to write a timing message 418 into control data carried in a protocol data unit 417 to be transmitted. The system comprises in the master network element 402 a processor unit 452 that is arranged to calculate a value T2−T1+T3 and to include said value T2−T1+T3 into the timing message 418. T2 is a time value measured with a clock device 462 of the master network element and associated with an arrival moment of the protocol data unit 412 that carries the time value T1 to the master network element. T3 is a time value measured with the clock device 462 of the master network element and associated with a transmission moment of the protocol data unit 417 from the master network element. The system comprises in the slave network element 401 a reading unit 453 arranged to read a timing message 416 from control data carried in a received protocol data unit 415. The system comprises in the slave network element 401 a processor unit 451 arranged to calculate an indicator of a timing offset between the slave network element and the master network element according to an equation (T2−T1+T3−T4)/2. T4 is a time value measured with the clock device 461 of the slave network element and associated with an arrival moment of the protocol data unit 417 that carries the value T2−T1+T3 to the slave network element. The system shown in FIG. 4 can operate according to what is presented in FIGS. 2a and 2b and in the text explaining said FIGS. 2a and 2b. The processor unit 451 is preferably arranged to control the clock device 461 on the basis of the indicator of the timing offset. The clock device 461 can be controlled e.g. as described in equation (4).

Figure 5:
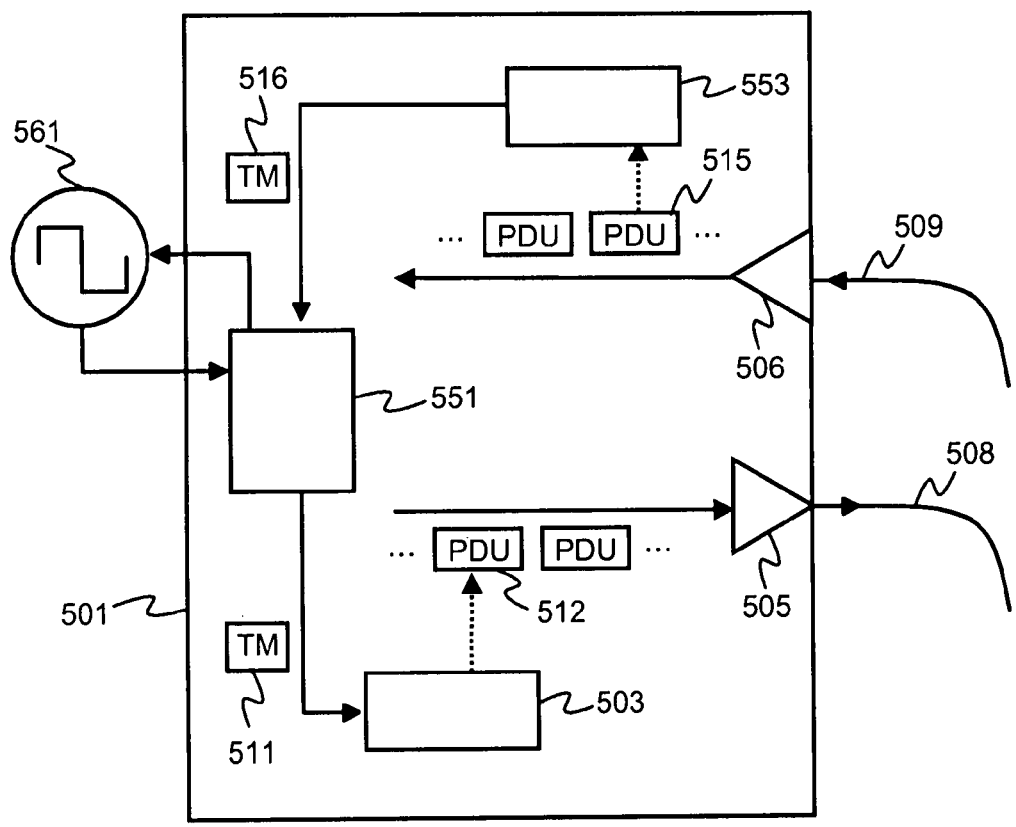
FIG. 5 shows a block diagram of a network element according to an embodiment of the invention.

FIG. 5 shows a block diagram of a network element 501 according to an embodiment of the invention. The network element comprises a transmitter 505 arranged to transmit protocol data units to a data transfer link 508. The network element comprises a receiver 506 arranged to receive protocol data units from a data transfer link 509. The network element comprises a writing unit 503 arranged to write a timing message 511 into control data carried in a protocol data unit 512 to be transmitted. The control data carried in the protocol data unit 512 can be a synchronization status message (Ethernet-SSM) carried in an Ethernet-frame, an overhead (OH) of a Synchronous Optical Network-frame (SONET), or an overhead (OH) of a Synchronous Digital Hierarchy-frame (SDH). The timing message 511 is dependent on a transmission moment of the protocol data unit 512 from the network element. The network element comprises a reading unit 553 arranged to read a received timing message 516 from control data carried in a received protocol data unit 515. The control data carried in the protocol data unit 515 can be a synchronization status message (Ethernet-SSM) carried in an Ethernet-frame, an overhead (OH) of a Synchronous Optical Network-frame (SONET), or an overhead (OH) of a Synchronous Digital Hierarchy-frame (SDH).

A network element according to an embodiment of the invention comprises means for operating as a master of a master-slave synchronization system. The network element comprises a processor unit 551 arranged to calculate a value Q2−Q1+Q3 and to include the value Q2−Q1+Q3 into the timing message 511. Q1 is a value extracted from the received timing message 516, Q2 is a time value measured with a clock device 561 and associated with an arrival moment of the protocol data unit 515 to the network element, and Q3 is a time value measured with the clock device 561 and associated with the transmission moment of the protocol data unit 512 from the network element. The clock device 561 can be a part of the network element 501 or the clock device can be an external device that is connected to the network element. Referring to FIGS. 2a and 2b, Q1 corresponds with T1, Q2 corresponds with T2, and Q3 corresponds with T3.

A network element according to an embodiment of the invention comprises means for operating as a slave of a master-slave synchronization system. In this case, the processor unit 551 is arranged to include the time value Q3 into the timing message 511 and to calculate an indicator of a timing offset according to an equation (Q1−Q2)/2. Q1 is the value extracted from the received timing message 516, Q2 is the time value measured with the clock device 561 and associated with an arrival moment of the protocol data unit 515 to the network element, and Q3 is the time value measured with the clock device 561 and associated with the transmission moment of the protocol data unit 512 from the network element. The processor unit 551 can be arranged to control the clock device 561 on the basis of the indicator of the timing offset e.g. as described in equation (4). Referring to FIGS. 2a and 2b, Q1 corresponds with T2−T1+T3, Q2 corresponds with T4, and Q3 corresponds with T1.

A network element according to an embodiment of the invention comprises means for operating, according to choosing, either as a slave or as a master of a master-slave synchronization system. The processor unit 551 is arranged to calculate a value Q2−Q1+Q3 and to include the value Q2−Q1+Q3 into the timing message 511 in a situation in which the network element is configured to operate as a master of the master-slave synchronization system. The processor unit 551 is arranged to include the time value Q3 into the timing message 511 and to calculate an indicator of a timing offset according to an equation (Q1−Q2)/2 in a situation in which the network element is configured to operate as a slave of the master-slave synchronization system. Q1 is the value extracted from the timing message 516, Q2 is the time value measured in the network element and associated with an arrival moment of the protocol data unit 515 to the network element, and Q3 is the time value measured in the network element and associated with the transmission moment of the protocol data unit 512 from the network element.

A network element according to an embodiment of the invention can be a terminal computer, an IP-router (Internet Protocol), an SDH-cross connect element (Synchronous Digital Hierarchy), an SDH-ADM (Add Drop Multiplexer), an MPLS-switch (MultiProtocol Label Switching), a SONET-cross connect element (Synchronous Optical Network), or a combination thereof.

A computer program product according to an embodiment of the invention comprises computer program modules for controlling a network element to support synchronization. The network element comprises a transmitter arranged to transmit a first protocol data unit and a receiver arranged to receive a second protocol data unit. The above-mentioned computer program modules are:

computer program modules for making the network element to write a first timing message into first control data carried in a first protocol data unit, the timing message being dependent on a transmission moment of the first protocol data unit from the network element, the first protocol data unit being one of following: an Ethernet-frame, a Synchronous Optical Network-frame (SONET), and a Synchronous Digital Hierarchy-frame (SDH), and the first control data being one of the following: a synchronization status message (Ethernet-SSM) carried in the Ethernet-frame, an overhead (OH) of the Synchronous Optical Network-frame (SONET), and an overhead (OH) of the Synchronous Digital Hierarchy-frame (SDH), and computer program modules for making the network element to read a second timing message from second control data carried in a second protocol data unit, the second protocol data unit being one of following: an Ethernet-frame, a Synchronous Optical Network-frame (SONET), and a Synchronous Digital Hierarchy-frame (SDH), and the second control data being one of the following: a synchronization status message (Ethernet-SSM) carried in the Ethernet-frame, an overhead (OH) of the Synchronous Optical Network-frame (SONET), and an overhead (OH) of the Synchronous Digital Hierarchy-frame (SDH).

A computer program product according to an embodiment of the invention comprises also computer program modules for making the network element to operate, according to choosing, either as a slave or as a master of a master-slave synchronization system. In this case, the computer program product comprises computer program modules for making the network element to calculate a value Q2−Q1+Q3 and to include the value Q2−Q1+Q3 into the first timing message in a situation in which the network element is configured to operate as a master of a master-slave synchronization system, and to include a time value Q3 into the first timing message and to calculate an indicator of a timing offset according to an equation (Q1−Q2)/2 in a situation in which the network element is configured to operate as a slave of the master-slave synchronization system. Q1 is a value extracted from the second timing message, Q2 is a time value measured in the network element and associated with an arrival moment of the second protocol data unit to the network element, and Q3 is a time value measured in the network element and associated with the transmission moment of the first protocol data unit from the network element. A computer program product according to this embodiment of the invention can further comprise computer program modules for making the network element to control a clock device on the basis of the indicator of the timing offset in a situation in which the network element is configured to operate as the slave of the master-slave synchronization system. The clock device can be a part of the network element or the clock device can be an external device that is connected to the network element.

The computer program modules can be e.g. subroutines and/or functions.

A computer program product according to an embodiment of the invention can be stored in a computer readable medium. The computer readable medium can be e.g. a CD-ROM (Compact Disc Read Only Memory) or a RAM-device (Random Access Memory).

A computer program product according to an embodiment of the invention can be carried in a signal that is receivable from a data transfer link connected to a network element.

While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the scope of the inventive idea defined in the independent claims.

What is claimed is:

1. A method for transferring a timing message from a first network element to a second network element, the first network element and the second network element being interconnected with data transfer elements of a digital data transfer network, the method comprising:
   in the first network element, writing the timing message into control data carried in a protocol data unit, the timing message being dependent on a transmission moment of said protocol data unit from the first network element, said protocol data unit being an Ethernet-frame, and said control data being a synchronization status message (Ethernet-SSM) carried in the Ethernet-frame,
   transferring said protocol data unit from the first network element to the second network element, and
   in the second network element, reading said timing message from said control data carried in said protocol data unit,
wherein the timing message includes a time value T1 measured in the first network element and associated with the transmission moment of said protocol data unit from the first network element, and the method further comprises:
   in the second network element, calculating a value $T2-T1+T3$, T2 being a time value measured in the second network element and associated with an arrival moment of said protocol data unit to the second network element, and T3 being a time value measured in the second network element and associated with a transmission moment of another protocol data unit from the second network element,
   in the second network element, writing another timing message into control data carried in said other protocol data unit, said other timing message including substantially said value $T2-T1+T3$,
   transferring said other protocol data unit from the second network element to the first network element,
   in the first network element, reading said value $T2-T1+T3$ from said control data carried in said other protocol data unit, and
   in the first network element, calculating an indicator of a timing offset between the first network element and the second network element according to an equation $(T2-T1+T3-T4)/2$, T4 being a time value measured in the first network element and associated with an arrival moment of said other protocol data unit to the first network element.

2. A system for transferring a timing message from a first network element to a second network element, the first network element and the second network element being interconnected with data transfer elements of a digital data transfer network, the system comprising:
   in the first network element, a writing unit arranged to write the timing message into control data carried in a protocol data unit, the timing message being dependent on a transmission moment of said protocol data unit from the first network element, said protocol data unit being an Ethernet-frame, and said control data being a synchronization status message (Ethernet-SSM) carried in the Ethernet-frame, and
   in the second network element, a reading unit arranged to read said timing message from said control data carried in said protocol data unit,
wherein the timing message includes a time value T1 measured in the first network element and associated with the transmission moment of said protocol data unit from the first network element, and the system further comprises:
   in the second network element, a processor unit arranged to calculate a value $T2-T1+T3$ and to include said value $T2-T1+T3$ into another timing message, T2 being a time value measured in the second network element and associated with an arrival moment of said protocol data unit to the second network element, and T3 being a time value measured in the second network element and associated with a transmission moment of another protocol data unit from the second network element,
   in the second network element, a writing unit arranged to write said other timing message into control data carried in said other protocol data unit,
   in the first network element, a reading unit arranged to read said value $T2-T1+T3$ from said control data carried in said other protocol data unit, and
   in the first network element, a processor unit arranged to calculate an indicator of a timing offset between the first network element and the second network element according to an equation $(T2-T1+T3-T4)/2$, T4 being a time value measured in the first network element and associated with an arrival moment of said other protocol data unit to the first network element.

3. A network element comprising a transmitter arranged to transmit a first protocol data unit and a receiver arranged to receive a second protocol data unit, the network element comprising:
   a writing unit arranged to write a first timing message into first control data carried in a first protocol data unit, the timing message being dependent on a transmission moment of said first protocol data unit from the network element, said first protocol data unit being an Ethernet-frame, and said first control data being a synchronization status message (Ethernet-SSM) carried in the Ethernet-frame,
   a reading unit arranged to read a second timing message from second control data carried in a second protocol data unit, said second protocol data unit being an Ethernet-frame, and said second control data being a synchronization status message (Ethernet-SSM) carried in the Ethernet-frame, and
   a processor unit arranged to calculate a value $Q2-Q1+Q3$ and to include said value $Q2-Q1+Q3$ into said first timing message, Q1 being a value extracted from said second timing message, Q2 being a time value measured in the network element and associated with an arrival moment of said second protocol data unit to the network element, and Q3 being a time value measured in the network element and associated with the transmission moment of the first protocol data unit from the network element.

4. A network element according to claim 3, comprising a processor unit arranged to include a time value Q3 into said first timing message and to calculate an indicator of a timing offset according to an equation $(Q1-Q2)/2$, Q1 being a value extracted from said second timing message, Q2 being a time value measured in the network element and associated with an arrival moment of said second protocol data unit to the network element, and Q3 being a time value measured in the network element and associated with the transmission moment of the first protocol data unit from the network element.

5. A network element according to claim 3, comprising a processor unit arranged to calculate a value Q2−Q1+Q3 and to include said value Q2−Q1+Q3 into said first timing message in a situation in which the network element is configured to operate as a master of a master-slave synchronization system, and to include a time value Q3 into said first timing message and to calculate an indicator of a timing offset according to an equation (Q1−Q2)/2 in a situation in which the network element is configured to operate as a slave of the master-slave synchronization system, Q1 being a value extracted from said second timing message, Q2 being a time value measured in the network element and associated with an arrival moment of said second protocol data unit to the network element, and Q3 being a time value measured in the network element and associated with the transmission moment of the first protocol data unit from the network element.

6. A network element according to claim 3, wherein the network element is one of the following: a terminal computer, an IP-router (Internet Protocol), an SDH-cross connect element (Synchronous Digital Hierarchy), an MPLS-switch (MultiProtocol Label Switching), a SONET-cross connect element (Synchronous Optical Network), and an SDH-ADM (Add Drop Multiplexer).

7. A computer readable non-transitory medium storing a computer program for controlling a network element to support synchronization, the network element comprising a transmitter arranged to transmit a first protocol data unit and a receiver arranged to receive a second protocol data unit, the computer program comprising:

computer program modules for making the network element to write a first timing message into first control data carried in a first protocol data unit, the timing message being dependent on a transmission moment of said first protocol data unit from the network element, said first protocol data unit being an Ethernet-frame, and said first control data being a synchronization status message (Ethernet-SSM) carried in the Ethernet-frame, computer program modules for making the network element to read a second timing message from second control data carried in a second protocol data unit, said second protocol data unit being an Ethernet-frame, and said second control data being a synchronization status message (Ethernet-SSM) carried in the Ethernet-frame, and computer program modules for making the network element to calculate a value Q2−Q1+Q3 and to include said value Q2−Q1+Q3 into said first timing message in a situation in which the network element is configured to operate as a master of a master-slave synchronization system, and to include a time value Q3 into said first timing message and to calculate an indicator of a timing offset according to an equation (Q1−Q2)/2 in a situation in which the network element is configured to operate as a slave of the master-slave synchronization system, Q1 being a value extracted from said second timing message, Q2 being a time value measured in the network element and associated with an arrival moment of said second protocol data unit to the network element, and Q3 being a time value measured in the network element and associated with the transmission moment of the first protocol data unit from the network element.

* * * * *